(12) United States Patent
Attaluri et al.

(10) Patent No.: US 10,303,791 B2
(45) Date of Patent: May 28, 2019

(54) EFFICIENT JOIN ON DYNAMICALLY COMPRESSED INNER FOR IMPROVED FIT INTO CACHE HIERARCHY

(71) Applicant: International Business Machines Corporation, Armonk, NY (US)

(72) Inventors: Gopi K. Attaluri, San Jose, CA (US); Ronald J. Barber, San Jose, CA (US); Naresh K. Chainani, Portland, OR (US); Guy M. Lohman, San Jose, CA (US); Ippokratis Pandis, Palo Alto, CA (US); Vijayshankar Raman, Sunnyvale, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 14/664,714

(22) Filed: Mar. 20, 2015

(65) Prior Publication Data
US 2016/0275145 A1 Sep. 22, 2016

(51) Int. Cl.
*G06F 17/30* (2006.01)
(52) U.S. Cl.
CPC .............. *G06F 17/30498* (2013.01)
(58) Field of Classification Search
CPC ...................................... G06F 17/30
See application file for complete search history.

(56) References Cited

U.S. PATENT DOCUMENTS

| 5,455,826 | A |   | 10/1995 | Ozveren et al. |
|---|---|---|---|---|
| 5,598,559 | A |   | 1/1997 | Chaudhuri |
| 5,706,495 | A | * | 1/1998 | Chadha ............. G06F 17/30324 707/999.002 |
| 5,740,440 | A |   | 4/1998 | West |
| 5,794,229 | A | * | 8/1998 | French ................. G06Q 40/00 707/999.002 |
| 5,893,086 | A |   | 4/1999 | Schmuck et al. |
| 5,930,785 | A |   | 7/1999 | Lohman et al. |
| 6,026,394 | A |   | 2/2000 | Tsuchida et al. |
| 6,052,697 | A |   | 4/2000 | Bennett |
| 6,134,601 | A |   | 10/2000 | Spilo et al. |
| 6,247,014 | B1 |   | 6/2001 | Ladwig et al. |
| 6,292,795 | B1 |   | 9/2001 | Peters et al. |
| 6,505,189 | B1 |   | 1/2003 | On Au et al. |
| 6,609,131 | B1 |   | 8/2003 | Zait et al. |

(Continued)

FOREIGN PATENT DOCUMENTS

CN 1522409 A 8/2004
CN 101013427 A1 8/2007

(Continued)

OTHER PUBLICATIONS

List of IBM Patents or Applications Treated as Related.
(Continued)

*Primary Examiner* — Khanh B Pham
(74) *Attorney, Agent, or Firm* — Sherman IP LLP; Kenneth L. Sherman; Steven Laut (57) ABSTRACT

A method includes joining data between at least two data sets. Values of one or more join attributes of each of the data sets is represented in a compressed form, indicated by an encoding scheme. A compression scheme for the one or more join attributes is dynamically selected.

18 Claims, 6 Drawing Sheets

(56) References Cited

U.S. PATENT DOCUMENTS

| | | |
|---|---|---|
| 6,757,677 B2 | 6/2004 | Pham et al. |
| 6,775,681 B1 | 8/2004 | Ballamkonda et al. |
| 6,937,652 B2 | 8/2005 | Gold et al. |
| 6,941,432 B2 | 9/2005 | Ronstrom |
| 6,954,776 B1 | 10/2005 | Cruanes et al. |
| 7,062,481 B2 | 6/2006 | Pham et al. |
| 7,136,883 B2 | 11/2006 | Flamma et al. |
| 7,177,883 B2 | 2/2007 | Yagawa |
| 7,287,131 B1 | 10/2007 | Martin et al. |
| 7,293,028 B2 | 11/2007 | Cha et al. |
| 7,308,539 B2 | 12/2007 | Fuhs et al. |
| 7,343,363 B1 | 3/2008 | Parker |
| 7,412,439 B2 | 8/2008 | Bossman et al. |
| 7,499,960 B2 | 3/2009 | Dageville et al. |
| 7,653,670 B2 | 1/2010 | Hasan et al. |
| 7,688,758 B2 | 3/2010 | Denby et al. |
| 7,716,180 B2 | 5/2010 | Vermeulen et al. |
| 7,827,182 B1 | 11/2010 | Panigrahy |
| 7,827,218 B1 | 11/2010 | Mittal |
| 7,868,789 B1* | 1/2011 | Binnig ............. G06F 17/30454 341/51 |
| 8,078,593 B1 | 12/2011 | Ramarao et al. |
| 8,145,642 B2 | 3/2012 | Cruanes et al. |
| 8,195,644 B2 | 6/2012 | Xu |
| 8,271,564 B2 | 9/2012 | Dade |
| 8,321,385 B2 | 11/2012 | Burroughs et al. |
| 8,346,810 B2 | 1/2013 | Beaverson et al. |
| 8,370,316 B2 | 2/2013 | Bensberg et al. |
| 8,438,574 B1 | 5/2013 | Lyle et al. |
| 8,443,155 B2 | 5/2013 | Adams et al. |
| 8,661,005 B2 | 2/2014 | McKenney et al. |
| 8,692,695 B2 | 4/2014 | Fallon et al. |
| 8,768,889 B1 | 7/2014 | Martin |
| 8,768,927 B2 | 7/2014 | Yoon et al. |
| 8,856,103 B2 | 10/2014 | Barber et al. |
| 9,098,201 B2 | 8/2015 | Benjamin et al. |
| 9,355,060 B1 | 5/2016 | Barber et al. |
| 9,430,390 B2 | 8/2016 | Mukherjee et al. |
| 9,454,560 B2 | 9/2016 | Cha et al. |
| 9,792,318 B2 | 10/2017 | Schreter et al. |
| 2001/0039609 A1 | 11/2001 | Houldsworth et al. |
| 2002/0016820 A1 | 2/2002 | DuVal et al. |
| 2004/0260684 A1 | 12/2004 | Agrawal et al. |
| 2005/0018683 A1 | 1/2005 | Zaho et al. |
| 2005/0033741 A1 | 2/2005 | Dombroski et al. |
| 2006/0117036 A1* | 6/2006 | Cruanes ............. G06F 17/30498 707/999.1 |
| 2006/0218176 A1 | 9/2006 | Sun Hsu et al. |
| 2007/0136317 A1 | 6/2007 | Przywara |
| 2007/0136346 A1* | 6/2007 | Morris ............. G06F 17/30498 707/999.101 |
| 2007/0244850 A1 | 10/2007 | Hoppe et al. |
| 2007/0245119 A1 | 10/2007 | Hoppe |
| 2008/0126706 A1 | 5/2008 | Newport et al. |
| 2008/0133583 A1 | 6/2008 | Artan et al. |
| 2008/0162402 A1 | 7/2008 | Holmes et al. |
| 2009/0006399 A1 | 1/2009 | Raman et al. |
| 2009/0024568 A1 | 1/2009 | Al-Omari et al. |
| 2009/0100223 A1 | 4/2009 | Murayama et al. |
| 2009/0187586 A1* | 7/2009 | Olson ............. G06F 17/30595 707/999.101 |
| 2009/0210445 A1 | 8/2009 | Draese et al. |
| 2009/0222659 A1 | 9/2009 | Miyabayashi et al. |
| 2010/0088309 A1 | 4/2010 | Petculescu et al. |
| 2010/0114868 A1 | 5/2010 | Beavin et al. |
| 2010/0131540 A1 | 5/2010 | Xu |
| 2010/0199066 A1 | 8/2010 | Artan et al. |
| 2010/0223253 A1 | 9/2010 | Gopal et al. |
| 2011/0060876 A1 | 3/2011 | Liu |
| 2011/0066593 A1 | 3/2011 | Ahluwalia et al. |
| 2011/0078134 A1 | 3/2011 | Bendel et al. |
| 2011/0107021 A1 | 5/2011 | Muthukumarasamy et al. |
| 2011/0283082 A1 | 11/2011 | McKenney et al. |
| 2011/0307471 A1* | 12/2011 | Sheinin ............. G06F 17/30303 707/714 |
| 2012/0011133 A1 | 1/2012 | Faerber et al. |
| 2012/0011144 A1 | 1/2012 | Transier et al. |
| 2012/0036134 A1 | 2/2012 | Malakhov |
| 2012/0117055 A1 | 5/2012 | Al-Omari et al. |
| 2012/0136846 A1 | 5/2012 | Song et al. |
| 2012/0136889 A1 | 5/2012 | Jagannathan et al. |
| 2012/0143877 A1 | 6/2012 | Kumar et al. |
| 2012/0158729 A1 | 6/2012 | Mital et al. |
| 2012/0166400 A1 | 6/2012 | Sinclair et al. |
| 2012/0173517 A1 | 7/2012 | Lang et al. |
| 2012/0260349 A1 | 10/2012 | Nagai et al. |
| 2012/0303633 A1 | 11/2012 | He et al. |
| 2012/0310917 A1 | 12/2012 | Sheinin et al. |
| 2013/0138628 A1 | 5/2013 | Bensberg et al. |
| 2013/0218934 A1 | 8/2013 | Lin et al. |
| 2013/0325900 A1 | 12/2013 | Barber et al. |
| 2014/0006379 A1 | 1/2014 | Arndt et al. |
| 2014/0025648 A1 | 1/2014 | Corbett et al. |
| 2014/0074819 A1 | 3/2014 | Idicula |
| 2014/0108489 A1 | 4/2014 | Glines et al. |
| 2014/0129568 A1 | 5/2014 | Kim et al. |
| 2014/0214794 A1 | 7/2014 | Attaluri et al. |
| 2014/0214795 A1 | 7/2014 | Attaluri et al. |
| 2014/0214855 A1 | 7/2014 | Attaluri et al. |
| 2014/0215019 A1 | 7/2014 | Ahrens |
| 2014/0337375 A1 | 11/2014 | Yue |
| 2014/0372388 A1 | 12/2014 | Alialuri et al. |
| 2014/0372392 A1 | 12/2014 | Attaluri |
| 2015/0088813 A1 | 3/2015 | Lahiri et al. |
| 2015/0301743 A1 | 10/2015 | Nagao et al. |
| 2016/0147457 A1 | 5/2016 | Legler et al. |
| 2016/0232169 A1 | 8/2016 | Archak et al. |

FOREIGN PATENT DOCUMENTS

| | | |
|---|---|---|
| CN | 101067822 A1 | 11/2007 |
| CN | 1003672239 C | 2/2008 |
| CN | 101231657 A | 7/2008 |
| CN | 103635902 A | 3/2014 |
| EP | 0457707 A2 | 11/1991 |
| WO | 2015076136 A1 | 6/2015 |

OTHER PUBLICATIONS

Anonymous, "System and Method for Usage Aware Row Storage in Database Systems", Jul. 23, 2010, pp. 1-4, ip.com. United States.
Anonymous, "High Performance Technique Using Join Collocation in a Massively Parallel Processing Relational Database Implementation", Jun. 14, 2012, pp. 1-5, IP.com, United States.
Anonymous, "CashMap: Processor Cache-Aware Implementation of Hash Tables", Jul. 5, 2013, pp. 1-7, IP.com, United States.
Mell, P., et al., "The NIST Definition of Cloud Computing", National Institute of Standards and Technology Special Publication 800-145, Sep. 2011, pp. 1-7, U.S. Department of Commerce, United States.
Raman, V., et al., "DB2 with BLU Acceleration: So Much More than Just a Column Store", Proceedings of the VLDB Endowment, Aug. 2013, pp. 1-12, vol. 6, No. 11, ACM, United States.
Spyros, B., et al., "Design and Evaluation of Main Memory Hash Join Algorithms for Multi-core CPUs", SIGMOD Int'l Conference on Management of Data, Jun. 12, 2011, pp. 1-12, ACM, United States.
Korn, D., et al., "The VCDIFF Generic Differencing and Compression Data Format (RFC3284)", Jul. 1, 2002, pp. 1-31, Network Working Group, IP.com, United States.
Lehman, T.J. "Design and Performance Evaluation of a Main Memory Relational Database System." 1986, PhD Dissertation, 334 pages, [Abstract Only], University of Washington, Madison, WI.
Leis, V., et al., "The Adaptive Radix Tree: ARTful Indexing for Main-Memory Databases", IEEE 29th International Conference on Data Engineering (ICDE), Apr. 8, 2013, pp. 38-49, IEEE, United States.
Levandoski, J., et al., "The Bw-Tree: A B-tree for New Hardware Platforms", IEEE 29th International Conference on Data Engineering (ICDE), Apr. 8, 2013, pp. 1-12, IEEE, United States.

(56) References Cited

OTHER PUBLICATIONS

Prokopec, A. et al., "Lock-Free Resizeable Concurrent Tries", Languages and Compilers for Parallel Computing, 2013, pp. 156-170, vol. 7146, Springer Berlin Heidelberg, Germany.
Areias, M. et al., "A Simple and Efficient Lock-Free Hash Trie Design for Concurrent Tabling", Theory and Practice of Logic Programming, May 14, 2014, pp. 1-10, Arxiv.org, Cornell University Library, United States.
Pandis, I. et al., "PLP: Page Latch-free Shared-everything OLTP", Proceedings of the 37th International Conference on Very Large Data Bases (VLDB Endowment), Aug. 29, 2011-Sep. 3, 2011, pp. 610-621, vol. 4, No. 10, United States.
Sewall, J. et al., "PALM: Parallel Architecture-Friendly Latch-Free Modifications to B+ Trees on Many-Core Processors", Proceedings of the 37th International Conference on Very Large Data Bases (VLDB Endowment), Aug. 29, 2011-Sep. 3, 2011, pp. 795-806, vol. 4, No. 11, United States.
Gao, H. et al., "Lock-free dynamic hash tables with open addressing", Journal of Distributed Computing, Jul. 2005, pp. 21-42, vol. 18, Issue 1, United Kingdom.
Xu, Y., "A Multi-Dimensional Progressive Perfect Hashing for High-Speed String Matching", Seventh ACM/ IEEE Symposium on Architectures for Networking and Communications Systems, 2011, pp. 167-177, IEEE Computer Society, United States.
Nan Hua. H., et al., "Rank-Indexed Hashing: A Compact Construction of Bloom Filters and Variants", IEEE, 2008, pp.73-82, United States.
Cleary, J.G., "Compact Hash Tables Using Bidirectional Linear Probing", IEEE Transactions on Computers, Sep. 1994, pp. 828-834, vol. C-33, No. 9, United States.
Li, Q., et al.; "Adaptively Reordering Joins during Query Execution", IEEE, 2007, pp. 26-35, United States.
Cutt, B., et al.; "Improving Join Performance for Skewed Databases", IEEE, 2008, pp. 1-5, United States.
Wang, W., et al.; "Investigating Memory Optimization of Hash-index for Next Generation Sequencing on Multi-core Architecture", IPDPSW IEEE 26th Inter. Conf., May 21-25, 2012, pp. 665-674, IEEE Computer Society, United States.
Chang. S., "Recent Advances of Compact Hashing for Large-Scale Visual Search", Columbia University, Oct. 2012, pp. 1-44, United States.
Marek, R., et al., "TID Hash Joins," CIKM, 1994, pp. 42-49, Gaithersburg, MD, United States.
Yan, Weipeng P. et al., "Performing Group-By before Join [query processing]," Proceedings 1oth International Conference on Data Engineering, 1994, pp. 89-100, IEEE, 1994.
List of IBM Patents or Patent Applications Treated as Related Form.
Yan, W.P. et al., "Performing Group-By Before Join", Proceedings 10th Int'l Conference on Data Engineering, 1994, pp. 1-30, IEEE, United States.
Xu, Y., "A Multi-Dimesional Progressive Perfect Hashing for High-Speed String Matching", Seventh ACM/ IEEE Symposium on Architectures for Networking and Communications Systems, 2011, pp. 167-177, IEEE Computer Society, United States.
U.S. Appl. No. 14/509,336, "Embracing and Exploiting Data Skew During a Join or Groupby", filed Oct. 8, 2014, 38 pages, United States.
List of IBM Patents or Patent Applications Treated as Related Form; U.S. Appl. No. 14/664,686, filed Mar. 20, 2015; U.S. Appl. No. 14/664,710, filed Mar. 20, 2015; U.S. Appl. No. 13/918,313, filed Jun. 14, 2013; U.S. Appl. No. 14/615,982, filed Feb. 6, 2015; U.S. Appl. No. 13/918,302, filed Jun. 14, 2013; U.S. Appl. No. 14/070,990, filed Nov. 4, 2013.
Anonymous, "CashMap: Processor Cache-Aware Implementation of Hash Tables", Jul. 5, 2013, pp. 1-7, IP.com, States United.
Anonymous, "Efficient Grouping Over Joins of Compressed Tables", Apr. 6, 2010, pp. 1-6, IP.com, United States.
Hu, K. et al. "Rapid multi-dimension hierarchical algorithm in data warehouse system", Computer Integrated Manufacturing Systems, Jan. 2007, pp. 196-201, vol. 13, No. 1, China [English-language translation: Abstract Only].
Raman, V., et al., "DB2 with BLU Acceleration: So Much More than Just a col. Store", Proceedings of the VLDB Endowment, Aug. 2013, pp. 1-12, vol. 6, No. 11, ACM, United States.
List of IBM Patents or Patent Applications Treated as Related.
Chinese Office Action dated Dec. 5, 2018 for Chinese Patent Application No. 201610177904.0 from ChinesePatent Office, pp. 1-15, Beijing, China.

* cited by examiner

EFFICIENT JOIN ON DYNAMICALLY COMPRESSED INNER FOR IMPROVED FIT INTO CACHE HIERARCHY

BACKGROUND

Embodiments of the invention relate to joins for hash tables, in particular, for an efficient join on a dynamically compressed inner for better fit into a cache hierarchy.

Hash joins are a common operator in business intelligence (BI) queries. Hash joins involve many random accesses to hash tables. On modern processors, the performance of joins depends on how well the join data structures fit in the memory hierarchy.

BRIEF SUMMARY

Embodiments of the invention relate to dynamically compressing an inner for better fit into a cache hierarchy. One embodiment includes a method including joining data between at least two data sets. Values of one or more join attributes of each of the data sets is represented in a compressed form, indicated by an encoding scheme. A compression scheme for the one or more joins attribute is dynamically selected.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
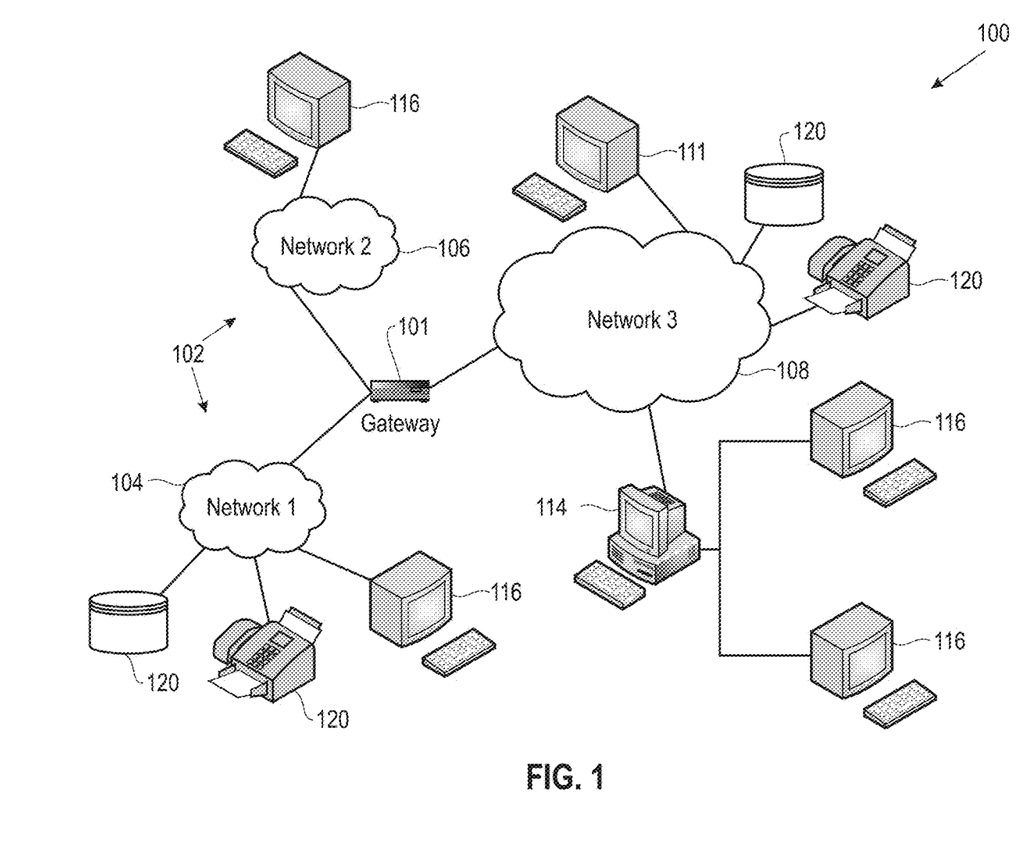
FIG. 1 is a network architecture for storing and recovering data for fast durability and quick journal-less recovery, according to an embodiment of the present invention.

FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

A hash table (HT) is made up of two parts: an array (the actual table where the data to be searched is stored) and a mapping function, known as a hash function. With a hash table, any value may be used as an index, such as a floating-point value, a string, another array, or even a structure as the index. This index is called the key, and the contents of the array element at that index is called the value. Therefore, an HT is a data structure that stores key/value pairs and can be quickly searched by the key. The hash function is a mapping from the input space to the integer space that defines the indices of the array. The hash function provides a way for assigning numbers to the input data such that the data can then be stored at the array index corresponding to the assigned number.

A hash join is an example of a join process and is used in the implementation of a relational database management system (DMS). The task of a join process is to find, for each distinct value of the join attribute(s), the set of tuples in each relation which have that value. Hash joins require an equi-join predicate (a predicate comparing values from one table with values from the other table using the equals operator '=').

An inner join creates a new result table by combining column values of two tables (e.g., table1 and table2) based upon the join-predicate. The query compares each row of table1 with each row of table2 to find all pairs of rows which satisfy the join-predicate. When the join-predicate is satisfied, column values for each matched pair of rows of A and B are combined into a result row.

A classic hash join algorithm for an inner join of two relations proceeds as follows. First prepare an HT of the smaller relation. The HT entries consist of the join attribute and its row. Because the HT is accessed by applying a hash function to the join attribute, it is quicker to find a given join attribute's rows by using this table than by scanning the original relation. Once the HT is built, the larger relation is scanned and the relevant rows from the smaller relation are found by looking in the HT. The first phase is usually called the "build" phase, while the second is called the "probe" phase. Similarly, the join relation on which the HT is built is called the "build" (also referred to as 'inner') input, whereas the other input is called the "probe" input (also referred to as 'outer'). The process requires that the smaller join relation fits into memory, which is sometimes not the case. A simple approach to handling this situation proceeds as follows:
1. For each tuple r in the build input R.
   1. Add r to the in-memory HT
   2. If the size of the HT equals the maximum in-memory size:
      1. Scan the probe input S, and add matching join tuples to the output relation
      2. Reset the HT
2. Do a final scan of the probe input S and add the resulting join tuples to the output relation.

In one or more embodiments, the system 100 utilizes a process for encoding join keys that produces a very tight code, guarantees that all keys will be encoded, and forms the encoding very cheaply, with no hash table lookups involved. Embodiments of the invention relate to dynamically compressing an inner for better fit into a cache hierarchy. One embodiment includes a method including joining data between at least two data sets. Values of one or more join attributes of each of the data sets is represented in a compressed form. A compression scheme for the join attribute is dynamically selected (e.g., based on the data type of a join attribute seen during a join operation).

Figure 2:
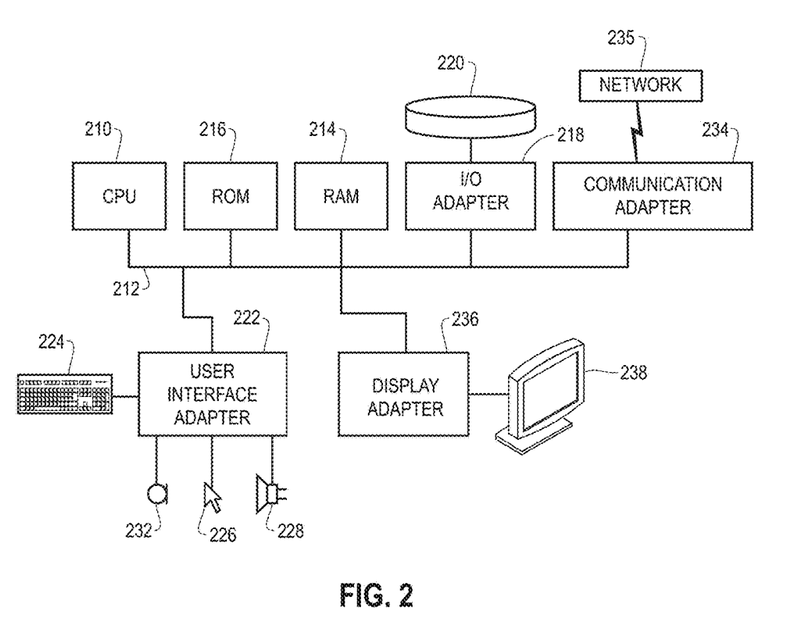
FIG. 2 shows a representative hardware environment that may be associated with the servers and/or clients of FIG. 1.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
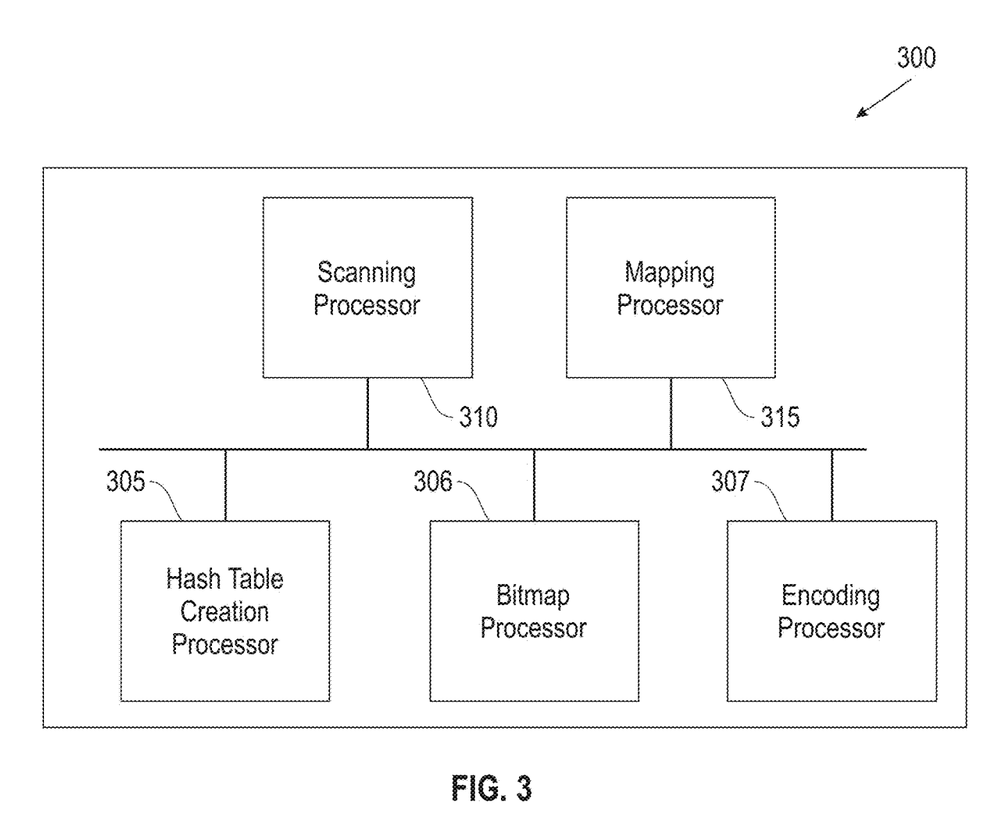
FIG. 3 illustrates a block diagram of an example system for dynamic selection of inner compression for a join operation, in accordance with an embodiment of the invention.

FIG. 3 illustrates a block diagram of an example system 300 for encoding join attributes, in accordance with an embodiment of the invention. In one embodiment, system 300 may include hardware components similar to the architecture shown in FIG. 2 and/or network 100. In one embodiment, the system 300 includes an HT creation processor 305, a bitmap processor 306, an encoding (or compression) processor 307, a scanning processor 310, and a mapping processor 315. In one embodiment, the HT creation processor 305 and the scanning processor 310 may perform hash table building and probes. In one embodiment, the mapping processor 315 provides one or more mapping/hash functions for assigning numbers to the input data.

In one embodiment, for numerical typed key columns, the encoding processor 307 encodes in the range from minimum to maximum value of columns of an inner, (e.g., as the inner exists during actual query execution). In one embodiment, if there are N possible values (in the domain) within that range, the encoding processor 307 represents them with log N bits, where N is a positive integer. All these logarithms must be taken to base 2, and the result rounded up to the nearest integer. While this produces a very compact code, it has a requirement that the scanning processor 310 has to scan the complete the join inner before the encoding processor 307 performs the assigning of codes—meaning two passes over the input. When this is not allowed, another embodiment includes the encoding processor 307 using the minimum and maximum (or second or third minimum and maximum, discarding possible outliers) found from statistics collection over the inner join, but this means the encoding processor 307 needs to support un-encoded keys.

In one embodiment, dates, times, and timestamps are treated as numerical typed key columns because they have a natural minus operator that is used for encoding. In the case of decimals (and Decfloats), the default minus operator may be used. However, greater efficiency is obtained by tracking the largest used scale in the key values, and the encoding processor 307 only encoding values within that scale. For example a DECIMAL(12,7) all of whose values range between 0.00 and 100.99, with no value having scale more than two digits, needs only log(10099+1) bits.

In one embodiment, the encoding processor 307 stores min-key and max-key values of the inner separately in a local list because sometimes MAXINT is used as a default value and will needlessly increase the range.

In one embodiment, for string typed key columns (e.g., 'CUST0001,' etc.), if there is a common prefix, the encoding processor 307 considers the suffix (after the longest common prefix) and performs a min/max of the suffix—e.g., if the suffix is 8 bytes, the encoding processor 307 encodes into an 8-byte code in the worst case (and may sometimes perform better based on min/max). In one embodiment, the encoding processor 307 supports overflow values (e.g., 1, 2, etc.) that do not match the prefix.

Figure 4:
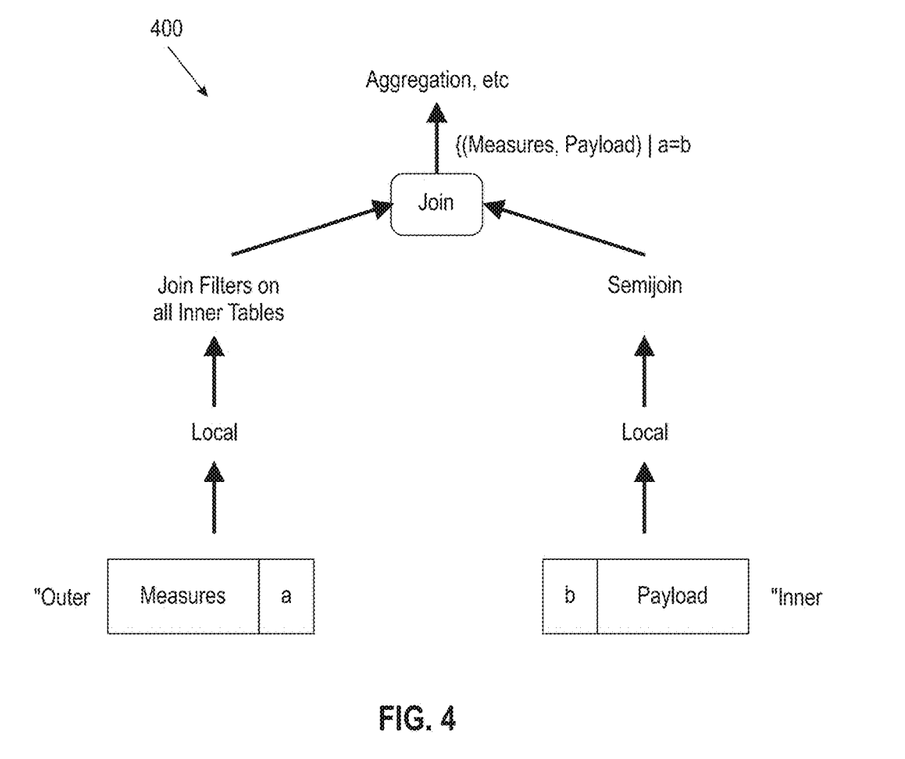
FIG. 4 illustrates an example of a hash join operator flow, in accordance with an embodiment of the invention.

FIG. 4 illustrates an example of a hash join operator flow 400, in accordance with an embodiment of the invention. In one embodiment, a two-table equijoin may be implemented, and this is fit in a standard query plan. In one embodiment, two tables may be joined, with equality predicate a=b, where a and b are typically single-column, but may be composite. Outer and inner are chosen using techniques standard in the art, such as to have |inner| small, to have an n:1 join, etc. In one embodiment, the outer and inner, and the overall join order, are chosen by a query optimizer that evaluates multiple query plans. In one embodiment, a join filter may be used. In one embodiment, the join filter may filter out most tuples that will not find a match (e.g., a Bloom filter).

In one embodiment, the encoding of the key values interacts with hashing and partitioning as follows. The join keys are typically hashed onto a hash table for fast lookups. This hashing, and partitioning, has to be performed on un-encoded keys because it is performed during the first scanning pass over the inner, when codes have not yet been assigned. In one embodiment, for composite join keys, the encoded join keys may be concatenated, but only after partitioning.

In one embodiment, encoding during the outer scan conducted as follows. During the outer scan the encoding processor 307 (FIG. 3) needs to encode the join foreign key values per the same encoding that is used for the inner. But for outer foreign keys that are outside the range of the inner (and hence not encodeable), for the inner joins, these foreign keys are eliminated, because they cannot find any matches. In one embodiment, for left outer joins, outer foreign keys that are not encodeable are marked as NULL, and assigned a dummy code (e.g., 0, etc.) by the encoding processor 307. Most of the time in left outer join, the actual foreign key values may not be needed later, and if they are needed, the actual foreign keys have to be accessed separately. In one embodiment, the bitmap processor 315 (FIG. 3) builds a bitmap based on the minimum and maximum values, indicating the keys that were actually found. This helps act as a top level join filter to eliminate tuples that won't find a match in the join (and for left outer joins, the foreign keys are marked as NULL if it fails the join filter (then during the join there is no need to attempt to fetch payloads).

The following is an example of an evaluator sequence. Suppose a key is C1, C2; auxiliary: month(c3), c4. In this example, the inner evaluator sequence is: LCOV(C1)→EncodePK→LCOV(C2)→EncodePK→Concatenate→LCOV (C3)→calculate month from C3→encoding on the month (if any)→LCOV(C4)→Concatenate→HashPartitionEval (where LCOV is an abbreviation for load column values, and PK is an abbreviation for the join attribute from the inner side). The join evaluators on the inner side include:

EncodePK: If the input join attribute values are at least partially compressed, we use this operator to produce a bi-format output: a vector of encoded values (GC), and a vector of unencoded values (VAL). In one example representation, (we use GC[i] is null and VAL[i] is null to indicate that the value is null, GC[i] null and VAL[i] is non-null to indicate an un-encoded value, and GC[i] is non null and VAL[i] is null to indicate an encoded value). This also tracks the minimum and maximum (or second or third minimum and maximum, thereby discarding outliers) value;

HashPartition Evaluator partitions the values according to the hash of the values of the join attribute.

Figure 5:
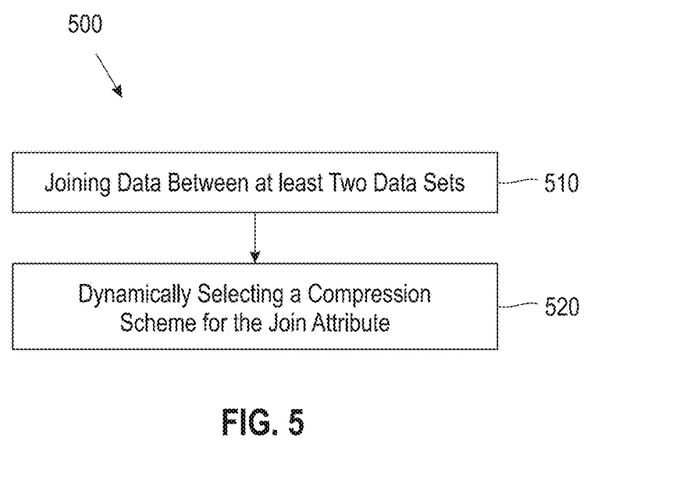
FIG. 5 illustrates a process for dynamic compression for join data, in accordance with an embodiment of the invention.

FIG. 5 illustrates a block diagram showing a process 500 for dynamic compression for join data, according to one embodiment. In one embodiment, in block 510 the process 500 performs joining data between at least two data sets (e.g., join columns), wherein values of one or more join attributes of each of the data sets is represented in a compressed form. In one embodiment, in bock 520 a compression scheme is dynamically selected for the one or more join attributes (e.g., based on type of join attribute data). In one embodiment, process 500 may provide that the at least two data sets are columns of at least two tables, and the values of the join attribute comprise join keys.

In one embodiment, process 500 may provide that for numerical typed key columns, the compression scheme selected is assigning codes for encoding in a range from a minimum value to a maximum value of one of the data sets involved in the join. In one embodiment, for N possible values within the range, the values are represented as ceiling (log N bits), where N is a positive integer and the ceiling function rounds up to the nearest integer or to the nearest multiple of significance. In one embodiment, process 500 may include scanning all records of the one of the data sets prior to assigning the codes.

In one embodiment, for decimal typed key columns, process 500 may include tracking a largest used scale in the values present in one of the data sets involved in the join, and only encoding values within that scale. In one embodiment, for character string typed key columns, if a common prefix exists among the values present in one of the data sets involved in the join, process 500 may use a suffix and assign codes in a range from minimum value to maximum value of a the suffix of those values.

In one embodiment, process 500 may further include hashing join keys onto a particular one of two hash tables and partitioning the particular one hash table. For composite join keys, process 500 may concatenate encoded join keys after the partitioning. In one embodiment, for join innerjoins, process 500 may provide that any records containing join column values that are not representable in the compression scheme are eliminated. In one embodiment, for left outer joins, process 500 may provide that for any records containing join column values that are not representable in the compression scheme selected, the join column values are marked as NULL and assigned a dummy code. In one embodiment, process 500 may include building a bitmap based on a range from minimum value to maximum value indicating join keys found during a scan. In one embodiment, the bitmap is used as a join filter. In one embodiment, for left outer joins, process 500 may include that join column values for records that fail to find a match when looking up the join filter are marked as NULL.

Figure 6:
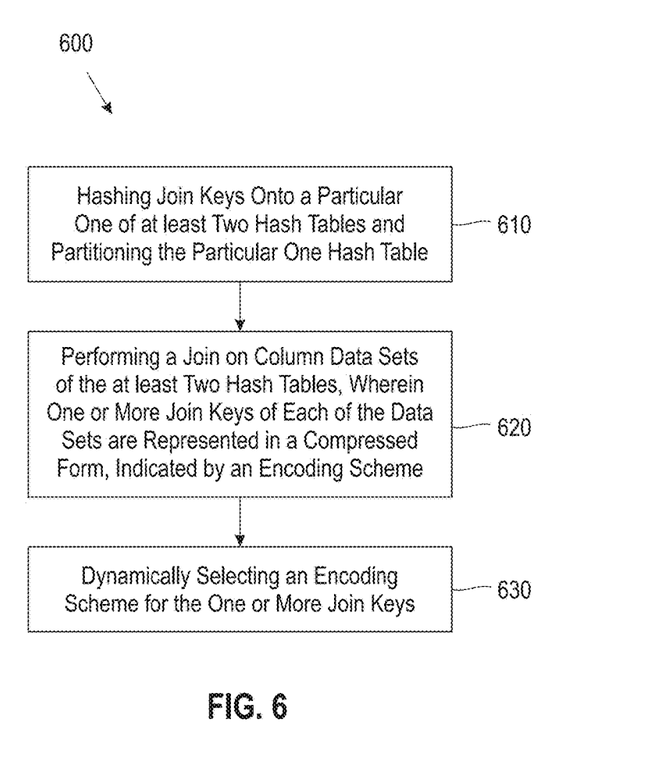
FIG. 6 illustrates a block diagram showing a process for dynamically selecting an encoding scheme for join keys, in accordance with an embodiment of the invention.

FIG. 6 illustrates a block diagram showing a process 600 for dynamically selecting an encoding scheme for join keys, according to one embodiment. In one embodiment, in block 610 process 600 includes hashing join keys onto a particular one of at least two hash tables and partitioning the particular one hash table. In one embodiment, in block 620 process 600 includes performing a join on column data sets of the at least two hash tables. In one embodiment, one or more join attributes of each of the data sets are represented in a compressed form. In one embodiment, in block 630 an encoding scheme is dynamically selected for the one or more join attributes.

In one embodiment, for numerical typed key columns, the encoding scheme selected for process 600 may include assigning codes for encoding in a range from minimum value to maximum value of one of the data sets involved in the join. In one embodiment, for N possible values within the range, the values are represented as ceiling (log N bits), where N is a positive integer. In one embodiment, for decimal typed key columns, process 600 may include tracking a largest used scale in the values present in one of the data sets involved in the join, and only encoding values within that scale. In one embodiment, for character string typed key columns, if a common prefix exists among the values present in one of the data sets involved in the join, process 600 may include using a suffix and assign codes in a range from minimum value to maximum value of a suffix of those values. In one embodiment, for join inners, process 600 may include eliminating any records containing join column values that are not representable in the compression scheme selected. In one embodiment, for left outer joins, process 600 may include for any records containing join column values that are not representable in the compression scheme selected, marking the join column values as NULL.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   joining, using a hash join process, data between at least two column data sets from hash table columns from at least two hash tables, wherein values of one or more join keys of each of the data sets is represented in a compressed form, indicated by an encoding scheme; and
   dynamically compressing the one or more join keys with a compression scheme during an outer scan operation of the hash join process, the compression scheme being dynamically selected based on join key data type, wherein different compression schemes are selected for the hash table columns including: numerical typed key columns, decimal typed key columns and character string typed key columns.

2. The method of claim 1, wherein for numerical typed key columns, the compression scheme selected comprises assigning codes for encoding in a range from minimum value to maximum value of one of the data sets involved in the join, and for N possible values within the range, the N possible values are represented as a ceiling function that rounds up log N in bits, where N is a positive integer.

3. The method of claim 2, further comprising scanning all records of the one of the data sets prior to assigning the codes.

4. The method of claim 1, wherein for decimal typed key columns, tracking a largest used scale in the values present in one of the data sets involved in the join, and only encoding values within that scale.

5. The method of claim 1, wherein for character string typed key columns, if a common prefix exists among the values present in one of the data sets involved in the join, assign codes in a range from minimum value to maximum value of a suffix of those values.

6. The method of claim 1, further comprising:
   during an inner scan operation:
      hashing unencoded join keys onto a particular one of two hash tables; and
      partitioning the particular one hash table;
   wherein for composite join keys, concatenating encoded join keys after said partitioning.

7. The method of claim 1, further comprising:
   for join inner-joins, any records containing join column values that are not representable in the compression scheme selected are eliminated; and
   for left outer joins, for any records containing join column values that are not representable in the compression scheme selected, the join column values are marked as NULL, and assigned a dummy code.

8. The method of claim 1, further comprising:
   building a bitmap based on a range from minimum value to maximum value indicating join keys found during a scan, wherein the bitmap is used as a join filter; and
   for left outer joins, join column values for records that fail to find a match when looking up the join filter are marked as NULL.

9. A computer program product for performing a hash join process, the computer program product comprising a computer readable storage medium having program code embodied therewith, the program code executable by a processor to:
   joining, using the hash join process, data between at least two column data sets from hash table columns from at least two hash tables, wherein values of one or more join keys of each of the column data sets is represented in a compressed form, indicated by an encoding scheme; and
   dynamically compressing the one or more join keys with a compression scheme during an outer scan operation of the hash join process, the compression scheme being dynamically selected based on join keys data type, wherein different compression schemes are selected for the hash table columns including: numerical typed key columns, decimal typed key columns and character string typed key columns.

10. The computer program product of claim 9, wherein for numerical typed key columns, the compression scheme selected comprises assigning codes for encoding in a range from minimum value to maximum value of one of the datasets involved in the join, and for N possible values within the range, the N possible values are represented as a ceiling function that rounds up log N in bits, where N is a positive integer.

11. The computer program product of claim 10, further comprising scanning all records of the one of the data sets prior to assigning the codes.

12. The computer program product of claim 9, wherein for decimal typed key columns, tracking a largest used scale in the values present in one of the data sets involved in the join, and only encoding values within that scale.

13. The computer program product of claim 9, wherein for character string typed key columns, if a common prefix exists among the values present in one of the data sets involved in the join, assign codes in a range from minimum value to maximum value of a suffix of those values.

14. The computer program product of claim 9, further comprising:
   during an inner scan operation:
      hashing unencoded join keys onto a hash table; and
      partitioning the hash table;
   wherein or composite join keys, concatenating encoded join keys after said partitioning.

15. The computer program product of claim 9, further comprising:
   for join inner-joins, any records containing join column values that are not representable in the compression scheme selected are eliminated; and
   for left outer joins, for any records containing join column values that are not representable in the compression scheme selected, the join column values are marked as NULL, and assigned a dummy code.

16. The computer program product of claim 9, further comprising:
   building a bitmap based on a range from minimum value to maximum value indicating join keys found during a scan, wherein the bitmap is used as a join filter; and
   for left outer joins, join column values for records that fail to find a match when looking up the join filter are marked as NULL.

17. A method comprising:
   hashing join keys onto a particular one of at least two hash tables and partitioning the particular one hash table;
   performing a hash join process on column data sets from hash table columns from the at least two hash tables, wherein one or more join keys of each of the data sets are represented in a compressed form, indicated by an encoding scheme; and
   dynamically compressing the one or more join keys with an encoding scheme during an outer scan operation of the hash join process, the encoding scheme being dynamically selected based on join attribute data type, wherein different encoding schemes for the one or more join keys are selected for the hash table columns including: numerical typed key columns, decimal typed key columns and character string typed key columns.

18. The method of claim 17, wherein:
for numerical typed key columns, the encoding scheme selected comprises assigning codes for encoding in a range from minimum value to maximum value of one of the data sets involved in the join, and for N possible values within the range, the N possible values are represented as a ceiling function that rounds up log N in bits, where N is a positive integer;
for decimal typed key columns, the encoding scheme selected comprises tracking a largest used scale in the values present in one of the data sets involved in the join, and only encoding values within that scale;
for character string typed key columns, the encoding scheme selected comprises if a common prefix exists among the values present in one of the data sets involved in the join, assign codes in a range from minimum value to maximum value of a suffix of those values;
for join inner-joins, any records containing join column values that are not representable in the encoding scheme selected are eliminated; and
for left outer joins, for any records containing join column values that are not representable in the encoding scheme selected, the join column values are marked as NULL.

\* \* \* \* \*